United States Patent Office 3,519,683
Patented July 7, 1970

3,519,683
PROCESS FOR PREPARING 5-AMINO-5-DEOXY-D-GLUCOSE-1-SULFONIC ACID
Shigeharu Inouye, Kanagawa-ken, and Teiichiro Ito, Tokyo, Japan, assignors to Meijiseika Kaisha Ltd., Tokyo, Japan
No Drawing. Filed Mar. 25, 1968, Ser. No. 715,987
Claims priority, application Japan, Mar. 31, 1967, 42/19,967
Int. Cl. C07c 143/10
U.S. Cl. 260—513                         6 Claims

ABSTRACT OF THE DISCLOSURE 5-amino-5-deoxy-D-glucose-1-sulfonic acid is prepared by (1) oxidizing 1,2-isopropylidene-3-benzyl-6-trityl-α-D-glucofuranose to 1,2-isopropylidene-3-benzyl-6-trityl-5-keto-α-D-glucofuranose, then (2) reducing the 5-ketone, as such, or after conversion to the 5-oxime, to yield 1,2-isopropylidene-3-benzyl-6-trityl-5-amino-5-deoxy - α - D - glucofuranose, then (3) debenzylating and detritylating the last-named compound with metallic lithium in liquid ammonia to form 1,2-isopropylidene-5-amino-5-deoxy-α-D-glucofuranose, and (4) sulfonating the latter with sulfurous acid to yield the desired product. The latter is useful in treating dysentery, etc.

---

The present invention relates to a process for preparing 5-amino-5-deoxy-D-glucose-1-sulfonic acid.

5-amino-5-deoxy-D-glucose-1-sulfonic acid, which is produced by the present invention, is a substance corresponding to a sulfurous acid additive of Nojirimycin (note Japanese patent No. Sho 43,760) an antibiotic agent obtainable by cultivating particular strain of Streptomyces, and exhibits strong inhibitive action against Sarcina lutea and Xanthomona oryzae.

The present invention provides a process for preparing 5-amino-5-deoxy-D-glucose-1-sulfonic acid, which comprises oxidizing 1,2-isopropylidene-3-benzyl-6-trityl-α-D-glucofuranose (I) with an oxidizing agent to form 1,2-isopropylidene-3-benzyl-6-trityl-5-keto - α - D - glucofuranose (II), as the first stage of operation,

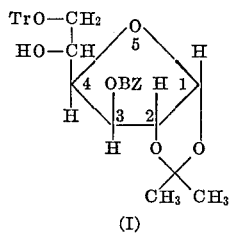
(I)

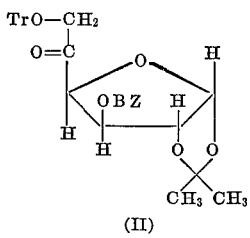
(II)

then either reducing the 5-keto compound (II) in an ammoniacal solution or reducing the same compound after it has been converted into an oxime in order to form 1,2-isopropylidene-3-benzyl-6-trityl-5-amino-5-deoxy-α-D-glucofuranose (III), as the second stage of operation, subsequently conducting debenzylation and detritylation by treating the 5-amino compound with metallic lithium in liquid ammonia to form 1,2-isopropylidene-5-amino-5-deoxy-α-D-glucofuranose (IV), as the third stage of operation, and sulfonating the compound (IV) with sulfurous acid as the fourth stage of operation, to obtain the final product 5-amino-5-deoxy-D-glucose-1-sulfonic acid (V).

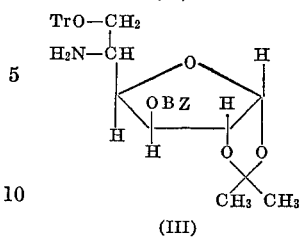
(III)

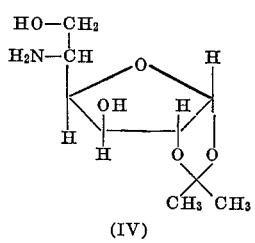
(IV)

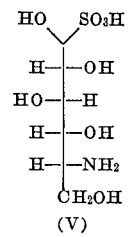
(V)

5-amino-5-deoxy-D-glucose-1-sulfonic acid (V) thus obtained exhibits strong inhibitive action against Sarcina lutea and Xanthomonus oryzae as described above. In addition, since the compound (V) obtained in this invention is a sulfurous acid additive of Nojirimycin as described above, various compounds produced in different stages of this invention are useful as intermediates in producing derivatives of Nojirimycin.

1,2-isopropylidene-3-benzyl - 6 trityl-α-D-glucofuranose (I), the starting material of the process of this invention, can be prepared in a known method from glucose as raw material, the yield being for example 62.4% to the amount of glucose consumed.

In the first stage of operation of this invention in which the starting material (I) described above is oxidized with a known oxidizing agent to produce the 5-ketone compound (II), the oxidizing agent and the solvent employed may be, for example, chromic acid-pyridine, ruthenium tetroxide-carbon tetrachloride, and dimethylsulfoxide-glacial acetic acid. Among them, the combination of dimethylsulfoxide with glacial acetic acid is the most preferable, the price of the reagents, the yield and ease of manipulation being considered. The oxidation reaction proceeds without any trouble at room temperature. Usually in several days a crude ketone substance (II) obtained by removing most remaining reagents and the solvent can be purified by crystallization.

The second stage of operation of this invention comprises either reducing the 5-ketone substance (II) in an ammoniacal solution, or converting the same 5-ketone substance (II) into the corresponding oxime and then reducing it, in order to obtain the 5-amino substance (III). To convert the 5-ketone substance (II) into the corresponding amino substance, the former is dissolved in methanol saturated with ammonia and then reduced with a reduction catalyst such as Raney nickel, the yield, however, being less than that in the following method in which the 5-oxime substance is prepared as an intermediate. To form the 5-oxime substance from the 5-ketone substance (II), hydroxylamine liberated by adding potassium hydrogen carbonate to hydroxylamine hydrochloride is added to a suspension of the 5-ketone substance (II) in methanol or ethanol, then the mixture is heated to boiling for complete dissolution, the insoluble matter being filtered off after cooling, and the filtrate is dried to obtain the oxime substance. In order to reduce the oxime to the 5-amino substance (III), the former is treated with a suitable reducing agent such as lithium aluminum hydride or Raney nickel, among which the most favorable is the hydrogen-containing Raney nickel employed in a methanolic solution saturated with ammonia. In this respect, ammonia should be added prior to the addition of Raney nickel. Otherwise, if Raney nickel is added in advance of ammonia or Raney nickel is used alone without ammonia, the reduction reaction of the oxime proceeds very slowly.

One of the features of this invention is that, in the process in which the starting material is oxidized to the 5-ketone substance, and the latter, or the oxime derived from the latter is subsequently reduced, the preferable D-glucose configuration prevails with a very meager by-product of L-idose configuration. In particular, although both D-glucose and L-idose configurations are possible depending on the configuration of the amino group which is produced when the 5-ketone compound is converted into 5-amino compound, the D-glucose configuration, which is preferred from the stereo-specific point of view, prevails over the other in the process of this invention, and thus the product of the L-idose configuration is formed only in a very little amount. The L-idose by-product can be removed, if necessary, by chromatography using alumina or silica gel, but no interference was observed when the separation was omitted before the third stage of operation was met.

The third stage of operation, which is intended to eliminate benzyl and trityl groups that are introduced for protecting hydroxy groups, is characterized by treating the 5-amino substance (III) with metallic lithium in liquid ammonia. Catalytic reduction process is generally accepted in the elimination of benzyl and trityl groups with platinum, palladium, or Raney nickel as catalyst. But the elimination of benzyl and trityl groups can be carried out with ease if the substance is treated with metallic lithium in liquid ammonia as is done in the process of this invention. In the process the slow rate of reaction of the 5-amino substance, because of the small solubility in liquid ammonia, can be accelerated by first dissolving it in anhydrous tetrahydrofuran or ethers such as ethyl ether and then adding liquid ammonia. The reduction proceeds without the 5-amino substance (III) being separated and the benzyl and trityl groups can be eliminated. Metallic sodium may be used in place of lithium, but this has a disadvantage in that sodium salt might be separated during the reaction which very probably retards the reaction. The product thus obtained by debenzylation and detritylation is extracted with water, and purified by passing through a column which is packed with ion exchange resin Dowex 1X2 (hydroxy type) (registered trademark of Dow Chemical Co.). Evaporation of the solvent readily gives the crystalline product.

In the fourth stage of operation, which is intended to sulfonate 1,2 - isopropylidine-5-amino-5-deoxy-α-D-glucofuranose (IV) obtained in the third stage, the compound (IV) is dissolved in water or aqueous methanol, left standing with sulfurous acid gas being added. Subsequently crystals of 5-amino-5-deoxy-D-glucose-1-sulfonic acid (V) separate from the solution. Since the reaction proceeds slowly at room temperature, the mixture is kept for 2–3 days at 35–40° C. until the reaction is completed.

The 1-sulfonic acid compound (V) obtained in this way evidenced the same antibacterial factor as Nojirimycin sulfurous acid additive against *Xanthomonus oryzae* and *Sarcina lutea* as examined by the usual paper disk test.

EXAMPLE 1

The first stage.—In a 1 liter flask was placed 83 g. of thoroughly dried powder of 1,2-isopropylidene-3-benzyl-6-trityl-α-D-glucofuranose. Six hundred ml. of dimethyl-sulfoxide which has been dried with calcium hydride and 90 ml. of acetic acid anhydride was added and the mixture was allowed to stand for 3 days at room temperature (20° C.). Then in a water bath of 35–45° C. the mixture was concentrated by evaporation under reduced pressure in dry nitrogen atmosphere. The residue was dissolved in 500 ml. of carbon tetrachloride, washed twice with a saturated solution of sodium bicarbonate and three times with water. The carbon tetrachloride tetracaloride layer was dehydrated with Glauber's salt and dried. The dried residue was dissolved by heating in cyclohexane and gave, on cooling, 50.4 g. of white crystals (M.P. 169–170° C.) of 1,2 - isopropylidene-3-benzyl-6-trityl-5-keto-α-D-glucofuranose. Evaporation of the mother liquor further gave 10.0 g. of the same crystals. Yield, 73%.

*Analysis.*—Calculated for $C_{35}H_{34}O_6$ (percent): C, 76.4; H, 6.2. Found (percent): C, 76.9; H, 6.6.

The second stage.—Twenty-one grams of 1,2-isopropylidene-3-benzyl-6-trityl-5-keto-α-D-glucofuranose obtained in the first stage of operation was suspended in 400 ml. of methanol, and 14 g. of potassium bicarbonate, and subsequently 10 g. of hydroxylamine hydrochloride were added to it. The mixture was heated over a water bath to a temperature which gave rise to boiling of methanol with the result that most substances were dissolved except a little potassium bicarbonate. After 30 minutes heating the mixture was cooled, the insoluble matters were filtered off, and then the solvent was distilled under reduced pressure. The resulting residue was dissolved in about 500 ml. of a chloroform-carbon tetrachloride (1:1) mixture, washed 3 times with water, then dried under a reduced pressure. The oily residue, when repeatedly dried with added methanol, gave 21.0 g. of a white powder (oxime substance).

Twenty grams of the powder was dissolved in 300 ml. of methanol, and ammonia gas was introduced therein for one hour to saturation while the solution was being cooled periodically in an ice-water bath. To this was added all at once a methanolic solution of 30 ml. of freshly prepared Raney nickel, and the mixture was thoroughly shaken and let stand over night. The catalyst was filtered off and the filtrate dried under reduced pressure. A benzene extract of the residue was washed with water, dried and then evaporated to dryness leaving 18.7 g. of a white powder, the yield being 94%. Three hundred grams of the final product was dissolved in ether, dried with an excess of salicylaldehyde, dissolved again in hot ethanol, and cooled in the air, giving 260 g. of 1,2-isopropylidene-3-benzyl-6 - trityl - 5-amino-5-deoxy-α-D-glucofuranose (N-salicylidene substance), M.P. 110° C. Analysis of the N-salicylidene substance: Calculated for $C_{42}H_{41}O_6N$; C, 76.9%; H, 6.3%; N, 2.1%. Observed: C, 76.6%; H, 6/4%; N, 2.4%.

Further, 500 mg. of the 5-oxime substance of 1,2-isopropylidene - 3 - benzyl - 6-trityl-5-keto-α-D-glucofuranose described above was dissolved in 50 ml. of ether, added dropwise into a 50 ml. ethereal suspension containing 400 mg. of lithium aluminum hydride, stirred for an hour at room temperature and for two hours at the boiling temperature of ether, and then kept standing over night. After successive additions of 6 ml. of ethyl acetate and 20 ml. of a 10% sodium hydroxide solution, the ethereal layer was separated, washed with water and heated to dryness to obtain 410 g. of residue.

314 g. of the final residue was dissolved in 3 ml. of chloroform, poured into a column containing 25 ml. of alumina, and then eluted successively with 60 ml. of chloroform, 50 ml. of 2% methanol-chloroform and 100 ml. of 5% ethanol-chloroform. On fractionating the eluate into 10 g. aliquots, the fractions No. 3–5 gave 156 mg. of 1,2 - isopropylidene - 3-benzyl-6-trityl-5-amino-5-deoxy-α-D-glucofuranose, while 109 mg. of a mixture of 1,2-isopropylidene - 3-benzyl - 6 - trityl - 5 - amino-5-deoxy-α-D-glucofuranose and 1,2-isopropylidene-3-benzyl-6-trityl-5-amino-5-deoxy-α-L-idofuranose were recovered from fractions 6–14.

The third stage.—4.0 g. of 1,2-isopropylidene-3-benzyl-6-trityl-5-amino-5-deoxy-α-D-glucofuranose was dissolved in 15 ml. of anhydrous tetrahydrofuran, and the resulting solution was introduced into a flask having three inlets and being equipped with a soda-lime desiccator tube. The solution was intensely cooled with chloroform-Dry Ice while ammonia was introduced into it. When the amount of liquified ammonia reached about 100 ml., metallic lithium was added in increments under agitation with a stirring apparatus. The solution turned red, then dark red. Lithium consumed amounted to about 250 mg. Agitation continued for 30 minutes, 3 g. of ammonium chloride was added and the mixture was decolorized. Agitation and cooling continued for one hour and were then terminated. The mixture was left to standing over night at room temperature.

To the residue 100 ml. of methanol was added, and with the white insoluble matter being filtered off the filtrate was evaporated to dryness. The residue was treated with 60 ml. of an extract mixture of methanol-chloroform (1:1), the white insoluble matter was removed, and the filtrate was again dried. Extraction of the residue with 40 ml. of chloroform and 40 ml. of water, and separating and drying the aqueous layer gave a light yellow oil. This was dissolved in 20 ml. of water and placed in a column (2.2×36 cm.) containing 150 ml. of ion exchange resin Dowex 1X2 (hydroxy type). The eluate which was positive to the ninhydrin reaction in an alkaline medium was collected and concentrated to dryness to give 1.17 g. of white crystals of 1,2-isopropylidene-5-amino-5-deoxy-α-D-glucofuranose. Recrystallization from ethyl acetate gave a product of which the melting point was 120–121° C., the yield being 74%.

Analysis.—Calc'd for $C_9H_{17}NO_3$ (percent): C, 49.3; H, 7.8; N, 6.4. Found (percent): C, 49.6; H, 7.9; N, 6.4.

The fourth stage.—350 mg. of 1,2-isopropylidene-5-amino-5-deoxy-α-D-glucofuranose was dissolved in 5 ml. of water, and sulfurous acid gas was introduced for 30 minutes to saturation while being cooled with ice-water. The mixture was tightly stoppered, soaked in a water bath at 35–40° C., kept warm over night and cooled, whereupon white crystals separated. To this was added 15 ml. of methanol, saturated with sulfurous acid gas. The mixture was cooled and the formed crystals, which amounted to 220 mg. were filtered off. The mother liquor was dried under reduced pressure, dissolved again in 5 ml. of water, saturated with sulfurous acid gas, kept over night at 35–40° C., and methanol was added there being formed 164 mg. of crystals. The same procedure, when repeated, afforded a recovery of 160 mg. of crystals of 5-amino-5-deoxy-D-glucose-1-sulfonic acid. The total yield was 400 mg. and the percentage yield was 96%.

The obtained crystals melted with bubbling decomposition at 145–147° C. on a hot-plate, and the infrared absorption spectrum thereof completely coincided with that of Nojirimycin sulfurous acid additive, which decomposed at 143° C. in a sulfuric acid bath and at 145–147° C. on a hotplate. Further the antibacterial test by the paper disk method showed identical circles of inhibition against *Xanthomonus oryzae* and *Sarcina lutea*.

Analysis.—Calc'd for $C_6H_{15}NO_8S$ (percent): C, 27.6; H, 5.8; N, 5.4; S, 12.2. Found (percent): C, 27.7; H, 5.7; N, 5.3; S, 12.7

EXAMPLE 2

2.5 g. of 1,2-isopropylidene-3-benzyl-6-trityl-α-D-glucofuranose was dissolved in 50 ml. of carbon tetrachloride, and 700 mg. of ruthenium tetroxide dissolved in 200 ml. of carbon tetrachloride was added to it at room temperature. About 50 ml. of an aqueous saturated sodium periodate solution was added to it and the mixture was shaken for 2 hours. Deposited sodium periodate was filtered off. The carbon tetrachloride layer, after being washed with water, was dried under reduced pressure. Recrystallization of the residue from cyclohexane gave 630 mg. of 1,2-isopropylidene-3-benzyl-6-trityl-5-keto-α-D-glucofuranose, the yield being 25%.

300 mg. of the latter compound was dissloved in 70 ml. of methanol while being heated, and ammonia was introduced for 30 minutes at room temperature until saturation was reached. After 10 ml. of freshly prepared Raney nickel was added, the mixture was agitated over night, the catalyst was filtered off, and the filtrate was dried under reduced pressure. The residue was treated with 50 ml. of chloroform for extraction, the resulting insoluble matter was filtered off, and the chloroform extract, after being washed with water, was dried under reduced pressure to give 493 mg. of white powder.

The powder was dissolved in 5 ml. of benzene and the mixture was introduced into a glass tube containing 30 ml. of alumina, washed with benzene, and then eluted with 5% ethanol in benzene to give 300 mg. of 1,2-isopropylidene-3-benzyl-6-trityl-5-amino-5-deoxy-α-D-glucofuranose, the yield being 60%.

The 5-amino-5-deoxy-D-glucose-1-sulfonic acid is useful more especially in the treatment of dysentery in patients (human or animal, e.g., dog, etc.). Administration to the patient is advantageously effected orally in doses of 250 to 500 mg. x 4 per day or by intermuscular injection in an amount of 250 mg. x 4 per day.

We claim:
1. Process for preparing 5-amino-5-deoxy-D-glucose-1-sulfonic acid, which comprises oxidizing with a mixture of dimethylsulfoxide and glacial acetic acid or with ruthenium tetroxide in carbon tetrachloride, the compound 1,2-isopropylidene-3-benzyl-6-trityl-α-D-glucofuranose (I) to 1,2-isopropylidene-3-benzyl-6-trityl-5-keto-α-D-glucofuranose (II), reducing (II) in an ammoniacal solution with Raney nickel to yield 1,2-isopropylidene-3-benzyl-6-trityl-5-amino-5-deoxy-α-D-glucofuranose (III), removing benzyl and trityl groups from (III) to yield 1,2-isopropylidene-5-amino-5-deoxy-α-D-glucofuranose (IV) by treating (III) with a member selected from the group consisting of metallic lithium in liquid ammonia and metallic sodium in liquid ammonia, and sulfonating (IV) with sulfurous acid to yield 5-amino-5-deoxy-D-glucose-1-sulfonic acid.

2. A process as in claim 1, wherein (II) is converted into the corresponding 5-oxime substance and the corresponding 5-oxime substance is reduced in an ammoniacal solution with Raney nickel to yield (III).

3. A process as in claim 2, wherein (II) is converted into the corresponding 5-oxime substance by reacting (II) with hydroxylamine.

4. A process as in claim 1, wherein the benzyl and trityl groups are removed from (III) by catalytically reducing (III), the catalyst utilized being selected from the group consisting of platinum, palladium and Raney nickel.

5. A process as in claim 1, wherein (I) is oxidized to (II) by reacting (I) with a mixture consisting substantially of dimethylsulfoxide and glacial acetic acid.

6. 5-amino-5-deoxy-D-glucose-1-sulfonic acid.

References Cited

Inouye et al.: Chem. Abstracts 66, 85989q (1967).

DANIEL D. HORWITZ, Primary Examiner

U.S. Cl. X.R.

260—210; 424—303